United States Patent [19]
Boulos et al.

[11] Patent Number: 5,194,990
[45] Date of Patent: Mar. 16, 1993

[54] LOW COLOR PURITY, ANTI-REFLECTION COATINGS FOR TRANSPARENT GLAZINGS ORIENTED AT HIGH ANGLES OF INCIDENCE

[75] Inventors: Edward N. Boulos, Troy; Mark F. Best, Taylor, both of Mich.

[73] Assignee: Ford Motor Company, Dearborn, Mich.

[21] Appl. No.: 772,397

[22] Filed: Oct. 7, 1991

[51] Int. Cl.$^5$ .............................................. G02B 1/10
[52] U.S. Cl. ................................... 359/587; 359/586; 359/588
[58] Field of Search ................ 359/580, 586, 587, 588

[56] References Cited

U.S. PATENT DOCUMENTS

| | | |
|---|---|---|
| 2,478,385 | 8/1949 | Gaiser . |
| 3,185,020 | 5/1965 | Thelen . |
| 3,604,784 | 9/1971 | Louderback ........................ 359/586 |
| 3,712,711 | 1/1973 | Adachi et al. . |
| 3,934,961 | 1/1976 | Itoh et al. ........................... 359/586 |
| 4,387,960 | 6/1983 | Tani ..................................... 359/588 |
| 4,771,167 | 9/1988 | Boulos et al. . |

OTHER PUBLICATIONS

Thetford, A., "A Method of Designing Three-Layer Anti-Reflection Coatings," Optica Acta, vol. 16, No. 1 (1969) pp. 37-43.

Turbadar, T., "Equi-Reflections Contours of Triple-Layer Anti-Reflection Coatings," Applied Optics Section, Imperial College, London (1964) pp. 195-205.

Primary Examiner—Bruce Y. Arnold
Assistant Examiner—J. P. Ryan
Attorney, Agent, or Firm—Charles H. Ellerbrock; Clifford L. Sadler

[57] ABSTRACT

Three-layer, low color purity, anti-reflection coatings reduce the reflection of visible light rays and display a low color purity when glazings carrying such coatings are oriented at high angles of incidence with respect to a source of visible light. The reflectances are comparable and the color purity values are lower for such glazings, when compared with conventional glazings coated with ¼-178-174 wavelength anti-reflection coatings.

11 Claims, No Drawings

LOW COLOR PURITY, ANTI-REFLECTION COATINGS FOR TRANSPARENT GLAZINGS ORIENTED AT HIGH ANGLES OF INCIDENCE

FIELD OF THE INVENTION

This invention relates generally to low color purity anti-reflection coatings for transparent glazings which are oriented for use at high angles of incidence, e.g., glazings installed as windshields in modern motor vehicles. More particularly, the invention relates to such low color purity anti-reflection coatings and their methods of use and manufacture.

BACKGROUND OF THE INVENTION

It is well known that the visible reflection of light rays from the surface of a planar substrate may be reduced by the deposition thereon of various singular or multiple layer coatings. In the optics and vision glazings fields, the primary emphasis has been directed toward reducing the observable coloration of the glazing as well as the reflection of light in the visible spectrum in the range from 4,000 to 7,000 Angstroms. Manufacturers and purchasers of anti-reflection glazings are particularly concerned with the color purity of such products, realizing that a lower color purity glazing appears more color-neutral than a high color purity product. Therefore, low color purity glazings are much more desirable for use as automotive and architectural windows.

Single layer anti-reflection coatings are well known. However, since the visible spectrum extends over a relatively wide wavelength band, and a single anti-reflection layer is principally designed to nullify reflection at a single wavelength, its use does not provided satisfactory results over the entire visual region. This limitation is particularly critical for optical elements and vision glazings made from transparent materials having refractive indices in the range from about 1.45 to about 1.9.

Three-layer anti-reflection coatings have greatly improved optical and vision characteristics over the known single layer coatings. Generally, the third layer which is the outer layer exposed to the atmosphere is designed to minimize the reflectance, and has a low refractive index with an optical thickness of one-quarter wavelength. As is well known to those skilled in the art, the optical thickness is the physical thickness multiplied by the index of refraction of the material. The optical thickness is normally designated as a fraction of the wavelength of the design light ray passing through the coating. Generally speaking, the design wavelength useful for designing anti-reflection coatings for optical elements and vision glazings is about 5,500 Angstroms.

In the conventional three-layer anti-reflection coatings known in the prior art, the second or middle layer has a high refractive index and an optical thickness of one-half wavelength. A one-half wavelength optical thickness coating does not alter the optical characteristics of the other layers, and therefore has no effect on the residual reflectance. However, it will augment the anti-reflection effect of the multiple layer coating for light rays having a range of wavelengths on either side of the design wavelength.

The first layer of the three layer anti-reflection coatings of the prior art, positioned between the middle layer and the substrate, generally has a medium refractive index and an optical thickness of one-quarter of a design wavelength. Generally, this layer acts as a matching layer between the other two layers and the substrate.

The individual anti-reflection layers generally comprise dielectric materials which are deposited as discrete laminae by conventional methods such as, for example, sol-gel coating, sputtering, or chemical vapor deposition. It is also known to employ two different dielectric materials having different refractive indicies which are co-deposited to achieve an arithmetic mean refractive index, or a continuously varying refractive index normal to the coated surface. The continuously varying refractive index may be achieved by varying the deposition rate of the two dielectrics with respect to the thickness of the deposited layer. Optical interference caused by these multiple layer dielectric materials generally produces transmitted and reflected colors which vary in color purity or intensity, frequently making the coated glazing unusable as an automotive or architectural window.

U.S. Pat. No. 4,771,167 to Boulos et al. discloses a three layer anti-reflection coating which is deposited on one of the inner surfaces of a laminated electrically heatable vehicle windshield. The coating reduces the reflectance and increases the visible transmittance of the windshield, to enable the electrically heatable windshield to meet U.S. federal regulations requiring an Illuminant A visible light transmittance greater than 70%. The disclosed layers which are sequentially deposited onto the glass substrate are, consecutively: $SiO_2$-$TiO_2$, 787 Angstroms thick; $TiO_2$, 635 Angstroms thick; and $SiO_2$, 934 Angstroms thick. This coating, however, is not designed to minimize the total reflectance of the coated and uncoated surfaces of the windshield when installed at a high angle of incidence while at the same time reducing the color purity or intensity of the perceived coloration of the coated windshield.

U.S. Pat. No. 2,478,385 to Gaiser discloses a three layer anti-reflection film for glass surfaces based upon the aforementioned $\frac{1}{4}$-$\frac{1}{2}$-$\frac{1}{4}$ wavelength theory. The disclosed layers comprise: $SnO_2$, 1,400 Angstroms; $TiO_2$, 2,800 Angstroms; and $SiO_2$, 1,400 Angstroms. Likewise, the anti-reflection layers disclosed in U.S. Pat. No. 3,185,020 to Thelen are based upon the $\frac{1}{4}$-$\frac{1}{2}$-$\frac{1}{4}$ wavelength theory, and comprise a third layer of $MgF_2$ (refractive index = 1.38), a second layer of $ZrO_2$ (refractive index = 1.9–2.3), and a first layer adjacent the glass surface of $CeF_2$ (refractive index = 1.8–1.85).

U.S. Pat. No. 3,934,961 to Itoh et al. discloses a three-layer anti-reflection film based upon the $\frac{1}{4}$-$\frac{1}{2}$-$\frac{1}{4}$ wavelength theory, wherein the third and second layers consist of conventional dielectrics and the first layer adjacent the glass surface consists of $Al_2O_3$-$ZrO_2$.

The aforementioned prior art, in which the three-layer anti-reflection coatings are based upon the $\frac{1}{4}$-$\frac{1}{2}$-$\frac{1}{4}$ wavelength theory, is directed toward reducing or eliminating the reflection from only that surface of the substrate to which the coating is adhered. The prior art does not teach nor suggest three-layer anti-reflection coatings which would be useful for reducing the reflection from both the coated and uncoated surfaces of a transparent sheet, or the multiple coated and uncoated surfaces of laminated transparent sheets (which sheet or sheets are oriented at high angles of incidence), while at the same time reducing the color purity to an almost visually undetectable level. The $\frac{1}{4}$-$\frac{1}{2}$-$\frac{1}{4}$ wavelength theory of optics is applicable only to light reflected from a single surface, and cannot predict the color purity of a multi-layered structure. In fact, it is well-known that most multi-layered structures display intense iridescence characterized by very high color purity values.

Other three-layer anti-reflection coatings are known which do not conform to the ¼-½-¼ wavelength theory, but which are effective in reducing reflected light from single surfaces. Such coatings are generally produced by experimenting with various combinations and permutations of dielectric materials, refractive indices, and thicknesses, and cannot be derived by resorting to any particular theory of optics. One such coating is disclosed in U.S. Pat. No. 3,712,711 to Adachi, wherein the first layer is a material of 0.3 wavelength thickness and a refractive index of 1.36, the second layer is a material of 1/30 wavelength thickness having a refractive index of 2.4–2.7, and the third layer is a material of 0.4 wavelength thickness and a refractive index of 1.65–1.75. As in the previously cited prior art, however, this coating is designed to reduce the reflection only from a single surface of the substrate oriented at a zero angle of incidence, and is not designed to minimize the color purity of the resultant article. The recited materials of construction, thicknesses, and refractive indices would not be useful for reducing the reflection of light from both the coated and uncoated surfaces of a transparent sheet oriented at a high angle of incidence while at the same time minimizing the color purity thereof.

Several publications recite mathematical formulae for determining the refractive indicies and thicknesses required for the individual laminae of three-layer, anti-reflection coatings useful for reducing the reflection of light rays from a singular coated surface of a planar substrate. See for example Thetford, A., "A Method of Designing Three-Layer Anti-Reflection Coatings," Optica Acta, v. 16, n. 1 (1969) 37–43. Other publications such as, for example, Turbadar, T., "Equi-Reflectance Contours of Triple-Layer Anti-Reflection Coatings," Applied Optics Section, Imperial College, London (1964) 195–205, disclose similar formulae, including factors for determining the path lengths of light traveling through the anti-reflection coating laminae, which at high angles of incidence are naturally greater than the path lengths of light rays which would otherwise travel normal to the coated surface. However, Turbadar only discloses actual laminae thicknesses which are derived from the ¼-½-¼ wave theory. Furthermore, Thetford and Turbadar do not disclose three-layer anti-reflection coatings which account for the reflectance contributions of surfaces other than the one to which the coating is adhered, such as would be encountered in a vision glazing having a first coated surface and a second coplanar uncoated surface. Finally, the two articles do not disclose coated structures having minimized color purity values.

It would be desirable to deposit a three-layer, anti-reflection coating on a surface of a transparent glazing, which coating would minimize the total reflection of visible light from the coated and uncoated surfaces when the transparent glazing is oriented at a high angle of incidence with respect to a source of the visible light while at the same time minimizing the color purity thereof to a level acceptable for use as an automotive or architectural glazing.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

SUMMARY OF THE INVENTION

Accordant with the present invention, a low color purity, anti-reflection coating capable of reducing the visible light reflection from the transparent glazing to which the coating is adhered when the coated glazing is oriented at a high angle of incidence with respect to a source of the visible light while at the same time minimizing the color purity of the coated glazing, has surprisingly been discovered. The coating comprises:

A) a first layer of dielectric material, having a refractive index from about 1.60 to about 1.75 and a thickness from about 750 Angstroms to about 950 Angstroms;

B) a second layer of dielectric material, having a refractive index from about 1.95 to about 2.35 and a thickness from about 1,050 Angstroms to about 1,350 Angstroms, adhered to the first layer; and C) a third layer of dielectric material, having a refractive index from about 1.38 to about 1.44 and a thickness from about 1,100 Angstroms to about 1,200 Angstroms, adhered to the second layer opposite the first layer.

Also contemplated within the scope of the present invention are glazing materials coated with the novel low color purity, anti-reflection coating, as well as automotive vision glazings which are mounted in vehicle bodies at high installation angles.

The invention is also directed to a method for minimizing the color purity and the reflection of visible light rays from a transparent glazing oriented at a high angle of incidence with respect to a source of the visible light.

Finally, the scope of the invention includes a process for preparing a coated glazing having the capabilities discussed hereinabove.

The articles of manufacture and processes of the present invention are particularly useful for manufacturing automotive and architectural glazings which are to be mounted for use at high angles of incidence with respect to a source of visible light.

DETAILED DESCRIPTION OF THE PREFERRED EMBODIMENT

The present invention is directed to three-layer, low color purity, anti-reflection coatings for transparent glazings, which glazings are to be oriented for use at high angles of incidence with respect to a source of visible light. The inventive coatings are substantially different from the anti-reflection coatings known in the prior art, which are derived from the ¼-½-¼ wavelength theory of optics, and which are useful only for minimizing the reflection of visible light solely from a single coated surface in a direction normal to the surface of the coated substrate. Also contemplated within the scope of the present invention is a method for preparing such coated transparent glazings, and a method for minimizing the color purity and the visible light reflection from a transparent glazing oriented at a high angle of incidence with respect to a source of the visible light.

The transparent glazings according to the present invention are formed from sheets of rigid transparent substrates which are well known in the art. Contemplated equivalent transparent substrates having the same operability and utility include, but are not necessarily limited to, glass (both single sheet and laminated glass) and plastics such as polycarbonates, polyacrylics, polyesters, and the like, as well as laminated structures prepared from same. A preferred transparent glazing is prepared from a single sheet of glass, or laminate made from multiple sheets of glass, produced by the well known float glass process. The transparent glazings may be of any thickness suitable for rigidly supporting the subsequently adhered low color purity, anti-reflection coatings, and which are known in the art as useful for manufacturing automotive and architectural glazings.

It is contemplated that the transparent glazings of the present invention will be oriented for ultimate use at a high angle of incidence with respect to a source of visible light. Such an orientation is illustrated by considering the angle at which a windshield is installed in a modern motor vehicle. The angle of incidence for such a glazing is that angle which a light ray striking its surface makes with a line normal to the surface of the glazing, and is equal to the angle formed between the light ray as it is reflected from the surface and a line normal to the surface of the glazing. This angle of incidence moreover is substantially equal to the angle formed between the surface of the glazing and the plane of the horizon, herein referred to as the "installation angle."

In modern automobiles, the installation angle or angle of incidence is often in the range from about 55° to about 70°. At these high angles, it is observed that the total reflectance from both surfaces of an uncoated glass sheet (refractive index=1.52) is from about 11% to about 25%. By comparison, the reflectance of the same glazing in a direction normal to the surface of the glazing is only about 8%. An increase in the reflectance of a transparent glazing corresponds to an equivalent decrease in the transmittance of visible light through the glazing. Thus, a transparent glazing which reflects 15% of the visible light therefrom conversely transmits 85% of the visible light therethrough.

The present invention is directed to three-layer, low color purity, anti-reflection coatings which are applied to a single surface of a transparent glazing or transparent glazing laminate, and which coatings are effective for reducing the visible light reflection from both the coated and uncoated surfaces of the glazing at high angles of incidence while at the same time minimizing the color purity of the structure. Such coatings cannot be developed utilizing the ¼-½-¼ wavelength theory of optics, which is designed to minimize reflectance only from a single surface of the glazing at a zero angle of incidence, and which cannot predict the color purity of multi-coated structures.

The invention is particularly useful in connection with laminated structures, e.g., laminated glass automotive windshields. Such windshields are well known in the art as comprising a pair of glass sheets laminated together by means of an adhesive interlayer therebetween.

A first layer of dielectric material, which is adhered directly to a surface of the transparent substrate, may be selected from metal oxides or mixtures of metal oxides such as, for example, $TiO_2$-$SiO_2$, $Al_2O_3$, $SiO_2$-$Ta_2O_5$, $ZrO_2$-$SiO_2$, and the like. This first layer of dielectric material has a refractive index from about 1.60 to about 1.75, and a thickness from about 750 Angstroms to about 950 Angstroms. A preferred first dielectric layer comprises $TiO_2$-$SiO_2$, having a refractive index of about 1.60 and a thickness of about 950 Angstroms.

A second layer of dielectric material is adhered directly to the previously applied first layer, and may be selected from metal oxides or mixtures of metal oxides such as, for example, $TiO_2$, $TiO_2$-$SiO_2$, $Ta_2O_5$, $SiO_2$-$Ta_2O_5ZrO_2$, and the like. This second layer of dielectric material has a refractive index from about 1.95 to about 2.35, and is deposited at a thickness from about 1,050 Angstroms to about 1,350 Angstroms. A preferred second dielectric layer comprises $TiO_2$, having a refractive index of about 1.95 and a thickness of about 1,350 Angstroms.

A third layer of dielectric material, which is adhered directly to the previously applied second layer, may be selected from dense or porous metal oxides or mixtures of dense or porous metal oxides such as, for example, $SiO_2$, $MgF_2$, $Al_2O_3$, $Al_2O_3$-$SiO_2$, $TiO_2$-$SiO_2$, $Na_2O$-$MgO$-$Al_2O_3$-$SiO_2$, fluorinated $MgO$-$SiO_2$, and the like. This third dielectric layer has a refractive index from about 1.38 to about 1.44, and is deposited at a thickness from about 1,100 Angstroms to about 1,200 Angstroms. A preferred third dielectric layer comprises porous $SiO_2$, having a refractive index of about 1.38 and a thickness of about 1,100 Angstroms.

Thus, a coated transparent glazing is defined which minimizes the color purity and visible light reflection at high angles of incidence. It has been discovered that the particular inventive combination of dielectrics, having the specified ranges of refractive indicies and thicknesses disclosed hereinabove, effectively minimizes the color purity of transparent glazings and reduces the total reflection of visible light from both the coated and uncoated surfaces of transparent glazings when oriented at high angles of incidence from about 55° to about 70°.

By way of contrast, the dielectric layer thicknesses taught by the prior art, such as the publications by Thetford and Turbadar which rely on the ¼-½-¼ wavelength theory of optics, are approximately 1,043 Angstroms for the first layer, 1,593 Angstroms for the second layer, and 1,321 Angstroms for the third layer, when using the preferred materials and refractive indicies of the present invention (i.e., $TiO_2$-$SiO_2$ at RI=1.60 for the first layer, $TiO_2$ at RI=1.95 for the second layer, and $SiO_2$ at RI=1.38 for the third layer).

The three-layer, anti-reflection coatings of the present invention are useful in a process for reducing visible light reflection from an otherwise uncoated transparent glazing or transparent glazing laminate which is oriented at a high angle of incidence relative to a source of the visible light. Furthermore, the coatings of the present invention reduce visible light reflection and color purity to less than those values attainable utilizing a typical ¼-½-¼ wavelength anti-reflection coating. The process comprises applying the three-layer, anti-reflection coating set forth hereinabove to one of the surfaces of the glazing, positioning the glazing such that it is oriented at a high angle of incidence with respect to a source of visible light, and thereafter directing visible light rays against the coated glazing at a high angle of incidence. Reflection of unwanted visible light is reduced by this process while achieving a low color purity, and consequently, the transmission of desired visible light passing through the glazing, when viewed by an observer positioned so as to directly receive both the unwanted reflected light and the desired transmitted light, is increased by a corresponding amount. This process is particularly important for minimizing the reflection of visible light rays emanating from the dashboard or instrument panel of a motor vehicle and reflected from the windshield into the driver's eyes. The transmittance of the windshield is thereby increased by a corresponding amount, allowing unhindered observation of the road in front of the motor vehicle.

Typically, the coatings of the present invention are placed on the inboard surface of an automotive windshield (the surface of the windshield closest to the vehicle operator). The coatings would, of course, be useful for reducing the reflection from any vision glazing in an automobile which glazing is oriented at a high angle of incidence while at the same time displaying a low color purity (by vision glazing is meant any transparent glazing for viewing events outside of the motor vehicle). The installation angle, and consequently the angle of incidence, for vision glazings in modern motor vehicles has been steadily increasing, and is now approaching 65° in an effort to reduce the overall drag coefficient of the motor vehicle. These higher installation angles result in an ever-increasing reflection of unwanted light rays from both of the uncoated surfaces of conventional, uncoated motor vehicle vision glazings. Thus, the coatings of the present invention were developed. Advantageously, the coatings of the present invention provide the additional benefit of a low color purity, making them particularly useful and commercially acceptable as automotive and architectural glazings.

The dielectric layers according to the present invention may be sequentially deposited onto a surface of a transparent glazing by any conventional method known in the art as being useful for applying metal oxides to the surface of a substrate such as, for example, a sol-gel dipping process, sputtering, vacuum evaporation, and chemical vapor deposition. A preferred method for depositing the dielectric layers is by the sol-gel process.

In a preferred embodiment of the present invention, the three-layer anti-reflection coating is prepared by the sol-gel coating process. This process is particularly useful because if permits the tailoring of a particular layer having a concomitant porosity, as well as the preparation of multicomponent blends which may be used to obtain properties intermediate those of conventionally applied dielectric layers. The three preferred sol-gel coating solutions are the so-called $TiO_2$-$SiO_2$-layer forming solution, the $TiO_2$ layer forming solution, and the $SiO_2$ layer forming solution. In the application of each layer, the surface of the transparent glazing to be coated is exposed to or dipped into that particular solution. The viscosity of the solution and the rate of withdrawal from the solution are controlled such that sufficient solution remains adhered to the glazing, so that when the adhered solution is hardened, it will have the thickness set forth hereinabove. An ordinarily skilled artisan requires no more than routine experimentation to determine the proper viscosity and withdrawal rate in order to achieve an appropriate thickness of sol-gel coating solution. Conventional measuring instruments may also be employed to measure the thicknesses of each sol-gel coating to insure that the proper dielectric thickness ultimately will be obtained.

The coating process may be performed by dissolving metal-containing compounds into appropriate organic solvents, to prepare the sol-gel solutions. Preferred metal-containing compounds are metal alkoxides. Alcohols, particularly lower aliphatic alcohols having from one to four carbon atoms, are preferred as solvents, although other organic solvents such as, for example, ketones, esters, and mixtures of ketones and esters may be used. Generally, water is also added to the sol-gel solution. The metal-containing compounds are transformed in the sol-gel solution into alcoholates having moieties such as, for example, $-OC_2H_5$, $-OC_3H_7$, or $-OC_4H_9$, depending upon the solvent used. Practically any silicon- or titanium-containing compounds which are soluble in the appropriate solvents may be used to practice the preferred process of the present invention. Examples of silicon-containing compounds which are useful according to the present invention are tetraethyl orthosilicate, tetramethyl orthosilicate, and tetrapropyl orthosilicate. Examples of useful titanium-containing compounds are titanium ethoxide, titanium isopropoxide, titanium n-propoxide, titanium n-butoxide, titanium isobutoxide, titanium diisopropoxide bis(2,4-pentanedionate), and titanium 2-ethylhexoxide. Preferred compounds for practicing the preferred embodiment of the present invention are tetraethyl orthosilicate and titanium isopropoxide.

Accordant with the teachings of the preferred embodiment, a porous $SiO_2$ layer forming solution is prepared by admixing about 1.0 mole of tetraethylocthosilicate, about 2.77 moles of ethanol, about 2.20 moles of water, and about $8.0 \times 10^{-4}$ mole of nitric acid (70% by weight). The ingredients are mixed and heated to a temperature between about 50° C. and about 60° C., and maintained at that temperature for about 16 hours during which the ingredients react to form the coating solution. This "aging" period may be reduced to between about 6 hours to about 8 hours by refluxing the mixture. The resultant mixture is diluted with about 21 moles of ethanol, to prepare the preferred porous $SiO_2$ layer forming solution.

Alternatively, a dense $SiO_2$ layer forming solution may be prepared by admixing about 1.0 mole of tetraethylorthosilicate, about 24.8 moles of ethanol, about 3.0 moles of water, and about 0.0012 moles of nitric acid (70% by weight). The ingredients are stirred for an extended period of time in an enclosed container to insure that the mixture is uniformly reacted. After several days of stirring, the solution is sufficiently aged to be used for preparing a dense $SiO_2$ layer on a substrate by the sol-gel process.

The $TiO_2$ layer forming solution of the preferred embodiment is prepared by admixing about 1.0 mole of titanium isopropoxide, about 42.0 moles of ethanol, about 1.95 moles of water, and about 0.045 moles of nitric acid (70% by weight). The solution is likewise aged before using in the sol-gel process.

A preferred $TiO_2$-$SiO_2$ layer forming solution is prepared by admixing suitable amounts of the $TiO_2$ layer forming solution and the dense $SiO_2$ layer forming solution in such a ratio so as to produce a combined $TiO_2$-$SiO_2$ layer forming solution which will result in a first dielectric layer having a refractive index of about 1.60. In the preferred embodiment, the $TiO_2$-$SiO_2$ layer forming solution is prepared by admixing about 25 mole percent of the $TiO_2$ layer forming solution and about 75 mole percent of the dense $SiO_2$ layer forming solution.

The surface of the transparent glazing which is to receive the three-layer, anti-reflection coating is dipped into the appropriate layer forming solution, and withdrawn at a uniform rate. Of course, where one major surface of a transparent glazing is to receive the coating and the other is not, the surface which is not to receive the coating must be masked or otherwise isolated by conventional methods well-known in the art of coating transparent glazings. The layer forming solution which is adhered to the glazing is thereafter dried in the presence of moisture (relative humidity from about 20% to about 60%) to leave as a residue a thick gel film. The gel film and substrate are then heated to a temperature which is far below the melting temperature of the transparent glazing. The reaction that takes place upon heating is primarily hydrolytic in nature, and possibly also of a pyrolytic nature in part. Reaction products such as alcohols and water are cleaved from the complex compounds contained in the gel. The layer solidifies by a polycondensation reaction to form a dense layer of the dielectric material.

Specifically, the $TiO_2$-$SiO_2$ layer is the first layer deposited onto a surface of the glass substrate according to the preferred embodiment of the invention. After this first layer is deposited, a heating and cooling cycle is used to consolidate and harden the $TiO_2$-$SiO_2$ layer to the desired thickness of about 950 Angstroms. The transparent substrate having the film of $TiO_2$-$SiO_2$ layer forming solution thereon is heated at a rate from about 2° C. to about 5° C. per minute to a temperature from about 400° C. to about 550° C., which temperature is maintained for a period of time from about ten minutes to about one hour. Thereafter, the glazing and first $TiO_2$-$SiO_2$ layer which has formed are cooled to room temperature at a rate from about 2° C. to about 5° C. per minute.

The second layer is deposited directly onto the first $TiO_2SiO_2$ layer, utilizing the same procedure, to produce a $TiO_2$ layer having the desired thickness of about 1,350 Angstroms.

The third layer is deposited directly onto the second $TiO_2$ layer, utilizing the same dipping, heating, and cooling procedures as used for the first and second layers, to form a $SiO_2$ layer about 1,100 Angstroms thick.

EXAMPLES

Glass panels are coated with a three-layer, low color purity, anti-reflection coating by a sol-gel process according to the present invention. The coatings comprise: a first layer of $TiO_2$-$SiO_2$, adjacent the glass surface; a second layer of $TiO_2$; and a third layer of $SiO_2$. The reflectances and color purities of the resultant coated panels are set forth in Table I. Also shown in Table I are the reflectances and color purities of the corresponding ¼-½-¼ wavelength theory coated panels which use the same materials of construction and refractive indicies as the Examples.

length theory of optics, but that the color purity values are in all cases much lower.

The preceeding examples may be repeated with similar success by substituting the generically or specifically described reactants and/or reaction conditions recited herein for those actually used in the preceeding examples.

From the foregoing description, one skilled in the art can easily ascertain the essential characteristics of this invention, and without departing from the spirit and scope thereof, can make various changes and modifications in the invention to adapt it to various usages and conditions.

What is claimed is:

1. A low color purity, anti-reflection coating comprising:
   A) a first layer of dielectric material, having a refractive index from about 1.60 to about 1.75 and a thickness from about 750 Angstroms to about 950 Angstroms;
   B) a second layer of dielectric material, having a refractive index from about 1.95 to about 2.35 and a thickness from about 1,050 Angstroms to about 1,350 Angstroms, adhered to the first layer; and
   C) a third layer of dielectric material, having a refractive index from about 1.38 to about 1.44 and a thickness from about 1,100 Angstroms to about 1,200 Angstroms, adhered to the second layer opposite the first layer.

2. The low color purity, anti-reflection coating according to claim 1, wherein the first layer comprises $TiO_2$-$SiO_2$, the second layer comprises $TiO_2$, and the third layer comprises $SiO_2$.

3. The low color purity, anti-reflection coating according to claim 1, wherein the first layer has a refractive index of about 1.60 and a thickness of about 950 Angstroms, the second layer has a refractive index of about 1.95 and a thickness of about 1,350 Angstroms, and the third layer has a refractive index of about 1.38 and a thickness of about 1,100 Angstroms.

4. A motor vehicle, comprising a vehicle body and a vision glazing positioned at a high installation angle in an opening within the vehicle body, wherein the vision glazing has adhered to a surface thereof a low color purity, anti-reflection coating, comprising:
   A) a first layer of dielectric material, having a refractive index from about 1.60 to about 1.75 and a thickness from about 750 Angstroms to about 950 Angstroms;

TABLE 1

| | Reflectance and Color Purity at 65° Angle of Incidence Illuminant C Light Source, Thickness in Angstroms | | | | |
|---|---|---|---|---|---|
| | 1st Layer: Thickness/Ref. Index | 2nd Layer: Thickness/Ref. Index | 3rd Layer: Thickness/Ref. Index | Reflectance % | Color Purity |
| Example 1 | 750/1.75 | 1050/2.35 | 1150/1.44 | 16.4 | 1.0 |
| Comparison 1 | 918/1.75 | 1268/2.35 | 1228/1.44 | 16.0 | 5.1 |
| Example 2 | 950/1.60 | 1050/2.35 | 1200/1.38 | 16.4 | 1.9 |
| Comparison 2 | 1043/1.60 | 1268/2.35 | 1321/1.38 | 15.8 | 7.4 |
| Example 3 | 750/1.75 | 1350/1.95 | 1180/1.38 | 16.2 | 1.6 |
| Comparison 3 | 918/1.75 | 1593/1.95 | 1321/1.38 | 15.6 | 4.0 |
| Example 4 | 850/1.65 | 1250/2.05 | 1130/1.42 | 16.2 | 0.6 |
| Comparison 4 | 997/1.65 | 1496/2.05 | 1258/1.42 | 16.1 | 2.4 |
| Example 5 | 950/1.60 | 1350/1.95 | 1100/1.38 | 15.9 | 0.2 |
| Comparison 5 | 1043/1.60 | 1593/1.95 | 1321/1.38 | 15.7 | 1.9 |
| Comparison 6 | 950/1.55 | 1350/1.95 | 1000/1.38 | 16.1 | 1.6 |
| Comparison 7 | 1093/1.55 | 1593/1.95 | 1321/1.38 | 16.1 | 0.9 |

It is observed that the reflectances of the inventive three-layer coatings are comparable to the reflectances obtained from the coatings taught by the ¼-½-¼ wave- B) a second layer of dielectric material, having a refractive index from about 1.95 to about 2.35 and a thickness from about 1,050 Angstroms to about 1,350 Angstroms, adhered to the first layer; and C) a third layer of dielectric material, having a refractive index from about 1.38 to about 1.44 and a thickness from about 1,100 Angstroms to about 1,200 Angstroms, adhered to the second layer opposite the first layer.

5. The motor vehicle according to claim 4, wherein the first layer comprises $TiO_2$-$SiO_2$, the second layer comprises $TiO_2$, and the third layer comprises $SiO_2$.

6. The motor vehicle according to claim 4, wherein the first layer has a refractive index of about 1.60 and a thickness of about 950 Angstroms, the second layer has a refractive index of about 1.95 and a thickness of about 1,350 Angstroms, and the third layer has a refractive index of about 1.38 and a thickness of about 1,100 Angstroms.

7. A coated glazing, having a color purity of about 0.2 and reflectance of about 15.9% for visible light directed toward the glazing at an angle of incidence of about 65°.

8. A process for preparing a low color purity, anti-reflection coated transparent glazing, comprising the steps of:

A) providing a transparent substrate, having a surface;

B) adhering to the surface of the transparent substrate a first layer of dielectric material, having a refractive index from about 1.60 to about 1.75 and a thickness from about 750 Angstroms to about 950 Angstroms;

C) adhering to the first layer, opposite the transparent substrate, a second layer of dielectric material, having a refractive index from about 1.95 to about 2.35 and a thickness from about 1,050 Angstroms to about 1,350 Angstroms; and D) adhering to the second layer, opposite the first layer, a third layer of dielectric material, having a refractive index from about 1.38 to about 1.44 and a thickness from about 1,100 Angstroms to about 1,200 Angstroms.

9. The process for preparing a low color purity, anti-reflection coated transparent glazing, according to claim 8, wherein the first layer comprises $TiO_2$-$SiO_2$, the second layer comprises $TiO_2$, and the third layer comprises $SiO_2$.

10. The process for preparing a low color purity, anti-reflection coated transparent glazing, according to claim 8, wherein the first layer has a refractive index of about 1.60 and a thickness of about 950 Angstroms, the second layer has a refractive index of about 1.95 and a thickness of about 1,350 Angstroms, and the third layer has a refractive index of about 1.38 and a thickness of about 1,100 Angstroms.

11. The process for preparing a low color purity, anti-reflection coated transparent glazing, according to claim 8, wherein steps B, C, and D are conducted utilizing a sol-gel process.

* * * * *